United States Patent [19]
Perham

[11] 3,826,280
[45] July 30, 1974

[54] QUICK-ACTING, SELF-RESETTING FLUID PRESSURE RELEASE VALVE ASSEMBLY

[75] Inventor: Roscoe E. Perham, Lebanon, N.H.

[73] Assignee: The United States of America as represented by the Secretary of the Army, Washington, D.C.

[22] Filed: Feb. 16, 1973

[21] Appl. No.: 333,438

[52] U.S. Cl............................. 137/624.14, 137/508
[51] Int. Cl............................................... F17d 3/00
[58] Field of Search ....... 137/508, 469, 474, 624.14

[56] References Cited
UNITED STATES PATENTS

| | | | |
|---|---|---|---|
| 2,013,372 | 9/1935 | Work | 137/469 |
| 3,258,029 | 6/1966 | Parrino | 137/508 |
| 3,430,652 | 3/1969 | Struck | 137/624.14 |
| 3,477,613 | 11/1969 | Mangel | 137/624.14 X |
| 3,497,108 | 2/1970 | Mason | 137/624.14 X |

Primary Examiner—Harold W. Weakley
Attorney, Agent, or Firm—Edward J. Kelly; Herbert Berl; Lawrence E. Labadini

[57] ABSTRACT

A valve that stores and releases pressurized fluid periodically and automatically using just the energy present within the fluid. A Belleville spring is employed in combination with a poppet valve arrangement to snap the valve open and to reclose the valve automatically. Build-up of pressure within the storage chamber of the valve assembly moves the valve against the compression of the Belleville spring until that point is reached wherein the spring snaps through carrying the valve to its full open position releasng the pressurized contents.

8 Claims, 2 Drawing Figures

QUICK-ACTING, SELF-RESETTING FLUID PRESSURE RELEASE VALVE ASSEMBLY

The invention described herein may be manufactured, used and licensed by or for the Government for governmental purposes without the payment to me of any royalty thereon.

BACKGROUND OF THE INVENTION

This invention relates to a valve operated by a fluid pressure differential, and more particularly, to a mechanical valve assembly that stores and releases a fluid under pressure periodically and automatically using the energy present in the pressurized fluid to operate said valve assembly.

A quick-acting, mechanical valve, that stores and releases periodically and automatically a pressurized fluid, is susceptible to a wide variety of useful applications. Such a valve provides the means for evenly distributing pulses of adiabatically cooled air from a moving aircraft for the purpose of cold fog nucleation and dissipation studies. The regular and repeated release of a volume of compressed air generates periodic pressure waves or sounds that may be used in measuring or mapping operations. An automatically repeating source of rapidly expanding air can also be used as a pressure level indicator or alarm, as well as an energy source for propelling solid devices, operating small tools and operating indexing devices. A problem confronting those skilled in the art in the past, has been the inability to construct a valve that would release a volume of pressurized fluid rapidly, completely and without chatter. It is among the objects of this invention to provide a light-weight, fluid pressure release valve assembly, that operates solely on fluid pressure differential, that is completely mechanical, and that can store and release, at predetermined intervals automatically, a quantity of pressurized fluid.

SUMMARY OF THE INVENTION

In essence, this invention consists of a valve body having an inner end open to a source of fluid under pressure and an outer end open to a region of lower pressure. A valve seat plate is mounted within said valve body so as to be capable of limited axial movement therein and functions to divide the valve body into a low pressure side and a high pressure side. An opening through the valve seat plate is closed by a valve disc which is movably mounted within the high pressure side of the valve body and is biased by spring means towards said valve seat plate. A Belleville spring mounted to the low pressure side of said valve body yieldably supports the valve seat plate between the inner and outer ends of the valve body. Means carried by the valve body limits the biased movement of the valve disc. The valve seat plate moves against the compression of the Belleville spring as fluid pressure builds up on its high pressure side. Movement of the valve disc stops as the Belleville spring reaches its negative spring rate region, whereupon the Belleville spring snaps through carrying the valve seat plate rapidly away from the valve disc causing the valve to substantially instantaneously reach its full open position allowing release of the pressurized fluid before the valve seat plate returns to its closed position against the valve disc in response to the action of the Belleville spring.

DESCRIPTION OF THE PREFERRED EMBODIMENTS

Figure 1:
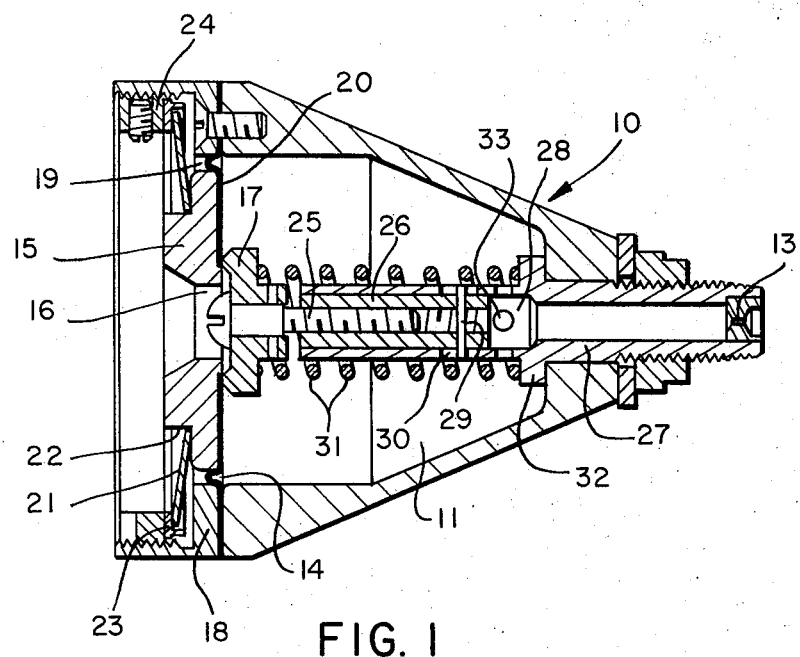
FIG. 1 is a transverse view in section of the valve assembly of the present invention in closed position.

Referring to the drawings and particularly to FIG. 1, there is shown a fluid pressure release valve assembly 10 according to the present invention having its valving elements in a position to allow the internal build-up and temporary storage of fluid under pressure. The assembly consists, in general, of a storage chamber 11, sized to contain the desired quantity of pressurized fluid, a valving means and an appropriate inlet orifice 13. Pressurized fluid is introduced into the storage chamber through the inlet orifice 13 which functions to control or restrict the rate of flow into the chamber. If a variable control of the inlet orifice should be desired, an appropriate needle valve may be employed in conjunction with the inlet orifice.

The storage chamber 11 is also provided with a circular outlet 14 opening in its wall which opening is covered or closed by valving means which opens in response to the development of a preselected pressure within the chamber, to allow the pressurized fluid to be dumped externally. The valving means comprises a circular valve seat plate 15 having a central opening 16 and a cooperating valve disc 17 which covers that opening. The valve seat plate 15 lies within the cylindrical bore 19 of a circular end plate (valve body) 18 mounted against the wall of a storage chamber so as to surround its circular outlet opening 14 and the valve seat plate 15 functions much like a piston in that it is axially movable within the bore (cylinder) 19 of the end plate. The space between the valve seat plate 15 and the bore 19 of the end plate 18 is sealed with a flexible membrane 20 to provide a pressure-tight seal. A Belleville spring 21, basically a conical washer, supports the valve seat plate 15 in the operative position shown in FIG. 1 with the valving elements 15 and 17 closed. The inner circular edge or rim of the Belleville spring 21 rests against a circular ridge 22 on the valve seat plate 15 and its outer circular edge or rim rests against a circular, flanged seat washer 23 which washer is, in turn, held in place in the end plate 18 by a suitable ring nut 24. The ring nut 24 is also an adjustment device for setting the valve release point. Some variation in spring characteristics is acceptable.

Central opening 16 of the valve seat plate is shown covered in FIG. 1 by a cooperating valve disc 17 which is located within the storage chamber 11. A valve stem 25 rigidly connected to the valve disc at one end is threadably engaged at the opposite end within a cylindrical stem guide 26. A center sleeve 27 threadably mounted to the rear wall of the storage chamber projects into the storage chamber 11 and receives the stem guide 26 within its cylindrical cavity 28. The stem guide 26 is movable within the center sleeve 27 in a direction normal to the plane of the central opening 16 of the valve seat plate 15. The stem guide 26 has a transverse pin 29 that fits into two axial opposed grooves 30 in the wall of the center sleeve 27 and is movable only within the limits defined by the grooves. Compression spring 31 surrounds the center sleeve 27 and at one end bears against a ridge 32 on the sleeve and at the opposite end bears against the valve disc 17. The force of the compression spring 31 holds the valve disc 17 against the valve seat 15 without overcoming that tension exerted by the Belleville spring 21 against the valve seat plate from the opposite direction.

Figure 2:
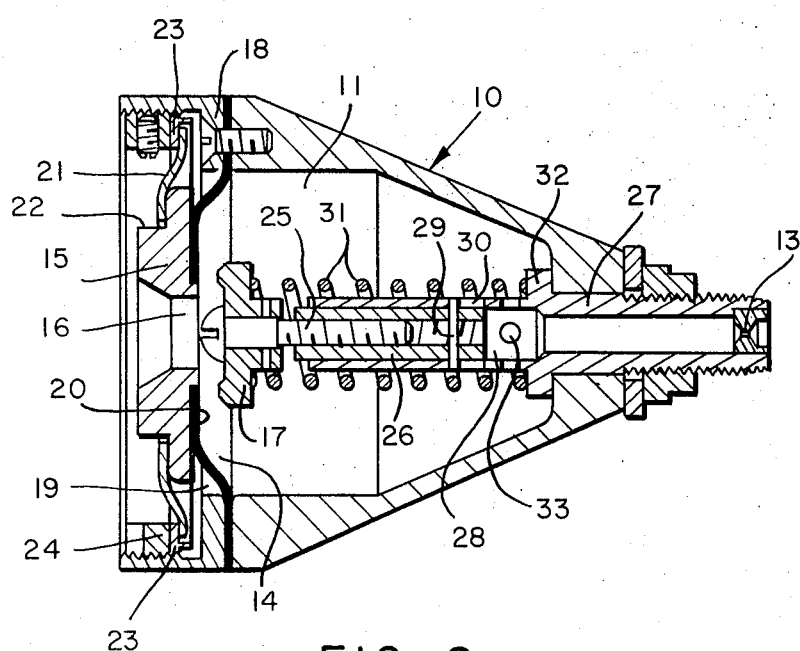
FIG. 2 is a transverse view in section of the valve assembly of FIG. 1 shown in its fully opened position.

In operation, pressurized fluid, e.g., compressed air from some external source (not shown), is introduced into the storage chamber by passage through an inlet orifice 13 having a restricted opening to retard the flow rate of the fluid and then passes through the hollow center passageway or cylindrical cavity 28 of the center sleeve 27 and finally through vent holes 33 into the cavity of the storage chamber 11. Pressure within the cavity continues to build-up until the pressure exerted against the valve seat plate (piston) 15 is sufficient to overcome the tension of the Belleville spring 21. This type of spring is characterized by having during the first part of its deflection a positive spring rate and a negative spring rate during the second part or phase of its deflection. That is to say, in the first part of its deflection, an increase in applied force results in an increase in deflection; but, in the second part of its deflection a force decrease can cause an increase in deflection. Since the Belleville spring is a conical washer, force is applied to flatten the washer and the energy stored in the spring during this flattening tends, after a certain deflection has been reached, to assist the applied force in reversing the direction of the cone. Thus, the energy stored during the first part of the deflection will act to move the washer rapidly during the second part of the deflection to cause it to snap or "pop through" and, thereafter the washer will return to its original configuration or shape. As the valve seat plate 15 moves axially in its bore 19 in response to the internal pressure within the cavity of the storage chamber 11 and against the tension of the Belleville spring, it eventually reaches the negative spring rate region of that spring and as the latter snaps or "pops through" it carries the valve seat plate 15 to its full open position as shown in FIG. 2.

The valve disc 17 follows the valve seat plate 15 in response to the force exerted by its compression spring 31 until it reaches the limit of its forward travel as defined by the movement of the transverse pin 29 in the opposed grooves 30 of the center sleeve 27. This limit to the following movement of the valve disc 17 coincides with the onset of the negative spring rate region of the Belleville spring 21 so that the valve disc stops as the valve seat plate 15, in response to the combined action of the stored energy of the Belleville spring and pressure within the cavity of the storage chamber, continues to move and rapidly accelerate away from the valve disc. As a consequence, the valve seat plate 15 rapidly snaps away from the valve disc 17 exposing the central opening 16 and allowing the pressurized fluid within the storage chamber 11 to be dumped overboard. Valve seat plate travel to the full open position as shown in FIG. 2 is mechanically limited by the deflection limits of the Belleville spring 21 in its support provisions to insure that sufficient positive force remains in the Belleville spring to return the spring to its original shape. The seat washer prevents irreversible snap through of the Belleville spring. With the sudden drop in pressure, the valve seat plate 15 and its supporting Belleville spring 21 return to their original position as shown in FIG. 1 and the valve disc 17 is likewise moved backward against its compression spring 31 to its original position.

When the valve seat plate closes against the valve disc, pressurization begins again and the cycle is repeated automatically and mechanically. The frequency of discharge of pressurized fluid from the valve assembly is governed mainly by the pressure of the fluid source, the orifice size, the chamber volume and the peak force of the Belleville spring.

If an ordinary compression spring were used to support the valve seat plate, the valve would only open a small gap and remain open as the fluid pressure drops with a high degree of valve chatter. Such a system would not provide the rapid and almost instantaneous release of the pressurized fluid that is accomplished by the foregoing described invention.

I claim:
1. A quick-acting, self-resetting, fluid pressure release valve comprising:
   a valve body defining a chamber therein having an inner end open to a source of fluid under pressure and an outer end open to a region of lower pressure,
   a valve seat plate mounted within said valve body for limited axial movement with respect thereto and dividing said valve body chamber into a low pressure side and a high pressure side, said valve seat plate having an opening therethrough,
   a Belleville spring mounted within the low pressure side of said valve body to yieldably support said valve seat plate between the inner and outer ends of said valve body,
   a valve disc movably mounted within the high pressure side of said valve body and biased towards said valve seat plate, said valve disc being adapted to close said opening in said valve seat plate, and
   means carried within the high pressure side of said valve body to limit movement of said valve disc to a predetermined point at which point movement of said valve seat plate has caused said Belleville spring to reach its negative spring rate region,
   whereby as said valve seat plate moves in response to increasing fluid pressure, said opening therein remains closed by said valve disc until said predetermined point is reached whereupon movement of said valve disc is stopped as said Belleville spring snaps allowing said valve seat plate to move rapidly away from said valve disc causing said valve to substantially instantaneously reach its fully open position allowing the rapid release of pressurized fluid therethrough before said valve seat plate returns to its closed position against said valve disc in response to the action of said Belleville spring.

2. A quick-acting, self-resetting, fluid pressure release valve according to claim 1 having fluid pressure control means mounted on said valve body which regulates the rate of fluid pressure build-up on the high pressure side of said valve seat plate.

3. A quick-acting, self-resetting, fluid pressure release valve according to claim 2 wherein said valve seat plate forms a movable pressure-tight seal within said valve body while its opening is closed by said valve disc.

4. A quick-acting, self-resetting, fluid pressure release valve according to claim 3 wherein said valve disc is biased toward said valve seat plate by spring means.

5. A quick-acting, self-resetting, fluid pressure release valve according to claim 4 wherein the tension exerted by said Belleville spring against said valve seat plate exceeds the tension of said spring means exerted against said valve disc.

6. A quick-acting, self-resetting, fluid pressure release valve according to claim 5 wherein said high pressure side of said valve body defines a storage chamber adapted to hold a quantity of pressurized fluid.

7. A quick-acting, self-resetting, fluid pressure release valve according to claim 6 wherein said fluid pressure control means comprises an inlet orifice which restricts the flow of pressurized fluid into said storage chamber.

8. A quick-acting, self-resetting, fluid pressure release valve according to claim 7 wherein said spring means biasing said valve disc is a compression spring.

* * * * *